April 25, 1967     H. H. KOEHL     3,315,721

CLINCH NUT

Filed Feb. 7, 1966

INVENTOR.
HANS H. KOEHL

BY

ATTORNEY.

United States Patent Office 3,315,721
Patented Apr. 25, 1967

3,315,721
CLINCH NUT
Hans H. Koehl, Brooklyn, Conn., assignor to C.E.M. Company, Inc., Danielson, Conn., a corporation of Connecticut
Filed Feb. 7, 1966, Ser. No. 525,409
6 Claims. (Cl. 151—41.74)

The present invention relates to a clinch nut which is adapted to be mounted on a supporting panel.

It is one object of the present invention to provide a clinch nut which a has a configuration permitting utilization of a particular attaching method.

It is another object of the present invention to provide a clinch nut wherein the centrally disposed tubular portion used in a known clinch nut is eliminated and a flat base is provided instead, whereby the flat base permits the attachment of a smaller threaded element in either a fixed of floating position. The threaded element can be smaller for the following reasons: The space required by a previously used collar can be eliminated and the threads are no longer lost by the necessity of having to undercut the threaded element, to fit on top of the flange and accordingly, a thinner thread element can be used.

It is still another object of the present invention to provide a clinch nut, which permits the use of thinner materials for the manufacture of a nut and of a flange thereof.

It is yet another object of the present invention to provide a clinch nut, which is designed basically such, to provide a flat base to which a threaded element can be attached in either a fixed or floating position and it can also be utilized with an internal threading element which has a beam action locking effect, as the bolt is tightened into the threaded nut element.

With these and other objects in view which will become apparent in the following detailed description, the present invention will be clearly understood in connection with the accompanying drawings, in which.

Figure 1:
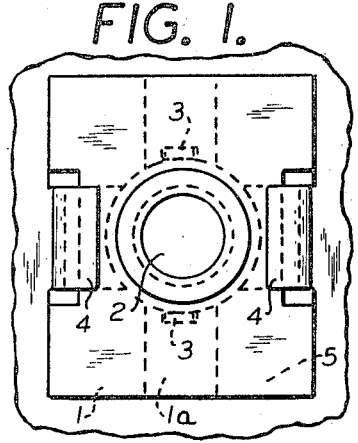
FIGURE 1 is an elevation of a first embodiment of a clinch nut.
Figures 2, 3:
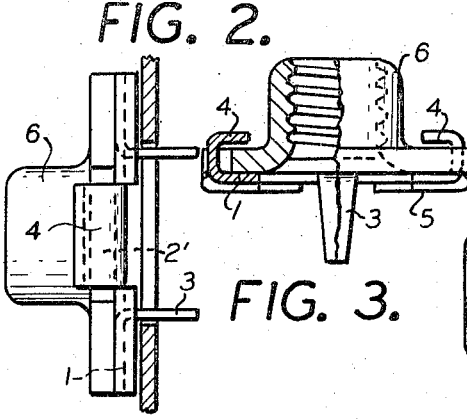
FIG. 2 is an end view thereof.
FIG. 3 is an end view, shown partly in section set-off relative to the showing in FIG. 2.
Figure 4:
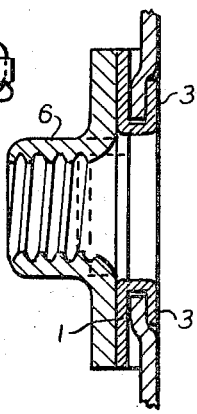
Figure 5:
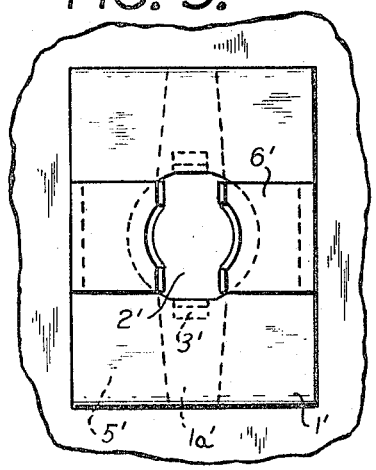
Figure 6:
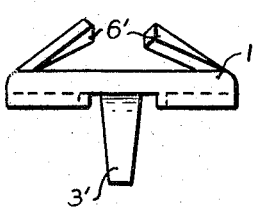
Figure 7:
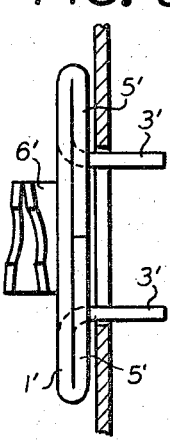
Figure 8:
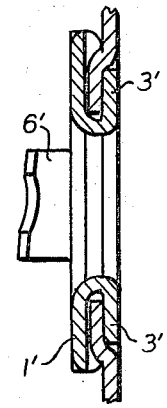
Figure 9:
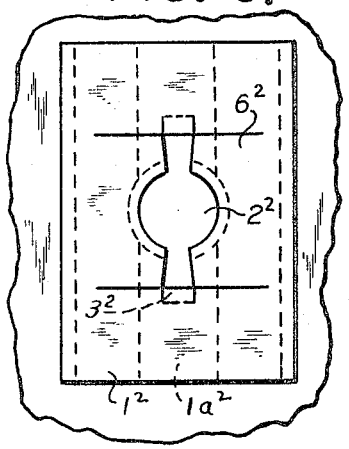
Figure 10:
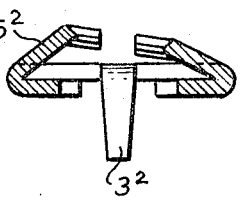
Figure 11:
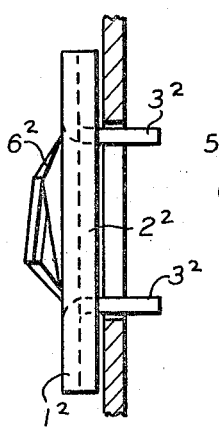
Figure 12:
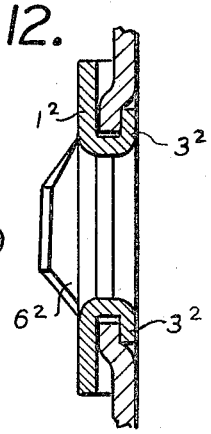

FIG. 4 discloses in a sectional view the clinch nut shown in FIGS. 1, 2 and 3, as applied to a panel;

FIG. 5 is a front elevation of a second embodiment of a clinch nut;

FIG. 6 is a side view thereof;

FIG. 7 is an end view of the clinch nut shown in FIG. 5, set-off relative to the showing of FIG. 6;

FIG. 8 is an axial section of a clinch nut showing the latter attached to a panel;

FIG. 9 is an elevation of a third embodiment of a clinch nut, designed in accordance with the present invention;

FIG. 10 is a side view thereof;

FIG. 11 is a section showing the clinch nut set-off compared with the showing of FIG. 10; and FIG. 12 is an axial section of the clinch nut shown in FIG. 9, indicating its attachment to a panel.

Referring now to the drawing and in particular to FIGS. 1 to 4, the clinch nut comprises a rectangular flange 1 having preferably longer ends and shorter sides and with two of its edges on the sides being bent over and under inwardly and a centrally disposed hole 2 with prongs 3 bent axially from the edge of the hole 2.

The prongs 3 are formed by cutting away two semicircular blanks leaving a strip of material between the straight side thereof, severing this strip centrally or diagonally, and then bending each end in axial direction, so as to leave a round hole 2 of a predetermined size, with two prongs 3 diagonally opposed which extend in an axial direction from the edge of the hole 2. The edges 5 of the rectangular flange 1, either on the sides or ends, but not both, are bent over and under inwardly in a predetermined manner on the side from which the above-described prongs 3 axially extend, leaving a slot 1a of predetermined width running centrally underneath the flange along the length thereof. The design is shown such that the prongs 3 are located centrally within the slot and during the installation these prongs 3 leave the material into the slots, the latter serving the same function as a cut-out in a previously known structure.

Centrally located on the sides of the flange 1 are two projections or tabs 4, which can be utilized to attach and prevent from turning a separate threaded element 6 either in a fixed or floating position.

Referring now again to the drawings and in particular to FIGS. 5 to 8, an embodiment of the clinch nut is disclosed, the prongs 3' of which are formed in the same manner as set forth in connection with the first described embodiment, yet the edges 5' of the flange 1' defining a center hole 2' are bent over and under inwardly from the ends and not from the side of the flange 1'. The length of the bent over tabs 5' is such, that the two tabs 5' will meet in the center of the nut in the short direction of the flange 1'. In the long direction of the flange 1', the bent over tabs 5' should not meet, but leave a slot $1a'$ similar to that described in the first embodiment. Centrally located on the long sides of the flange 1' are two tabs which are designed, as to form a flexible threaded element 6' with inherent locking features.

Referring now still again to the drawing and in particular to FIGS. 9 to 12, a third embodiment of the clinch nut is disclosed, wherein again a rectangular flange $1^2$ is provided in which prongs $3^2$ are arranged which are merely pierced centrally and bent downwardly without cutting away of semi-circular blanks, as provided in the previous embodiment. A thread receiving element $6^2$ is then formed at the edges from which the prongs $3^2$ are cut. The sides of this threading element $6^2$ can be pierced towards the side of the flange $1^2$ to create a spring locking effect. The side edges $5^2$ of the flange $1^2$ are again bent over and under inwardly creating the slot $1a^2$ underneath the flange $1^2$ for the same purposes as set forth in the other embodiments.

While I have disclosed several embodiments of the present invention, it is to be understood that these embodiments are given by example only and not in a limiting sense, the scope of the present invention being determined by the objects and the claims.

I claim:
1. A clinch nut, comprising
   a flange member having a centrally disposed hole,
   said flange member having oppositely disposed edges and oppositely disposed ends,
   two of said opposite edges of said flange member being bent over and under inwardly to assume an abutting relationship with the main portion of said flange member, and defining a slot therebetween,
   prongs extending axially downwardly from the edge of of said hole so as to be disposed on the underside of said flange member and centrally disposed within said slot, and the latter in conjunction with said prongs locking said nut into sheet material, and
   two tabs extending centrally from the sides of said flange member so as to be disposed on the upper side of said flange member and comprising a securing member.

2. The clinch nut, as set forth in claim 1, wherein said securing member comprises a threaded element.

3. The clinch nut, as set forth in claim 1, wherein said flange member has two of its opposite edges bent over on its sides.

4. The clinch nut, as set forth in claim 1, wherein said flange member has two of its opposite edges bent over on its ends.

5. The clinch nut, as set forth in claim 1, wherein said two tabs are disposed on opposite sides of said flange member and forming a flexible threaded element.

6. The clinch nut, as set forth in claim 5, wherein the sides of said tabs are severed from said main body portion and attached to said main body portion adjacent the sides of said flange member, in order to create a spring locking effect.

References Cited by the Examiner

UNITED STATES PATENTS

| | | | |
|---|---|---|---|
| 1,502,399 | 7/1924 | Renner | 85—32 |
| 2,070,005 | 2/1937 | Dom et al. | 85—36 |
| 2,146,128 | 2/1939 | Oldham | 151—41.72 |
| 2,233,224 | 2/1941 | Quarnstrom | 10—86 |
| 2,323,689 | 7/1943 | Tinnerman | 151—41.75 |
| 2,404,372 | 7/1946 | Hallock | 151—41.74 |
| 2,433,138 | 12/1947 | Marcell | 151—41.76 |
| 2,567,902 | 9/1951 | Bedford | 151—41.75 |
| 3,189,076 | 6/1965 | Adams | 151—41.75 |

CARL W. TOMLIN, *Primary Examiner.*

MARION PARSONS, Jr., *Examiner.*